United States Patent
Schnurnberger et al.

(10) Patent No.: US 6,221,923 B1
(45) Date of Patent: *Apr. 24, 2001

(54) CROSS-LINKING OF MODIFIED ENGINEERING THERMOPLASTICS

(76) Inventors: Werner Schnurnberger, Pfafenwaldring 38-40, 70569 Stuttgart; Jochen Kerres, Asternweg 11, 73760 Ostsfildern; Wei Cui, Allmendring 16a/18, 70569 Stuttgart, all of (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/868,943

(22) Filed: Jun. 4, 1997

(30) Foreign Application Priority Data

Jun. 4, 1996 (DE) .............................................. 196 22 337

(51) Int. Cl.$^7$ ........................... B01D 71/68; B01D 71/66
(52) U.S. Cl. .................................. 521/27; 521/30; 521/32; 521/33; 525/535; 525/540; 525/359.1; 525/382
(58) Field of Search .................................. 521/30, 27, 33, 521/32; 525/535, 540, 359.1, 382

(56) References Cited

U.S. PATENT DOCUMENTS

| | | |
|---|---|---|
| 2,783,212 * | 2/1957 | Schnell . |
| 3,855,122 * | 12/1974 | Bourganel . |
| 4,029,582 * | 6/1977 | Ishii . |
| 4,167,610 | 9/1979 | Bolto et al. ............................ 521/31 |
| 4,594,308 * | 6/1986 | Nakamura ............................ 430/213 |

FOREIGN PATENT DOCUMENTS

| | | |
|---|---|---|
| 2448054 | 7/1975 | (DE) . |
| 3544210 | 6/1987 | (DE) . |
| 4112508 | 10/1992 | (DE) . |
| 4425216 | 1/1996 | (DE) . |

OTHER PUBLICATIONS

March, "Advanced Organic Chemistry", Fourth Edition, 410, Wiley (New York), 1992.*

Seymour et al., "Polymer Chemistry, An Introduction", Second Edition, 467, Marcel Dekker (New York), 1988.*

Assink, et al., (1991) "Preparation of oxidatively stable cation–exchange membranes by the elimination of tertiary hydrogens" *Journal of Membranes Science*, 56:143–151.

Nolte, et al., (1993) "Partially sulfonated poly (arylene ether sulfone)—A versatile proton conducting membrane material for modern energy conversion technologies" *Journal of Membrane Science*, 83:211–220.

Kerres, et al., (1995) "Synthesis of new sulfonated polymers and their application in electro–membrane processes." *Euromembrane '95 Congress*, Bath (UK).

Kice, et al., (1963) "The Mechanism of the Disproportionation of Sulfinic Acids. The Thermal Decomposition of p–Tolueneusulfinyl p–Tolyl Sulfone and its Reaction with p–Toluenesulfinic Acid." *J. Org. Chem.* 28:1162–1163.

Ashworth, (1990) "Analytical methods." *The Chemistry of Sulfonic Acids, Esters and their Derivatives.* John Wiley & Sons, Chap. 4, pp. 87–105.

Allen, (1942) "Aliphatic Sulfinic Acids. Analysis and Identification." *J. Org. Chem.* 7:23–30.

* cited by examiner

*Primary Examiner*—Fred Zitomer
(74) *Attorney, Agent, or Firm*—Brobeck, Phleger & Harrison, LLP

(57) ABSTRACT

The present invention pertains to a process for the cross-linking of modified engineering thermoplastics, in particular, of polymeric sulfinic acids or sulfinic acid salts.

In particular, the invention pertains to a process for the preparation of cross-linked polymers, characterized in that solutions of polymeric sulfinic acids or sulfinic acid salts (—$SO_2Me$), optionally in the presence of organic di- or oligohalogeno compounds [$R(Hal)_x$], are freed from solvent and cross-linked to polymers, wherein Me stands for a monovalent or polyvalent metal cation;

R stands for an optionally substituted alkyl or aryl residue containing from 1 to 20 carbon atoms; and Hal stands for F, Cl, Br or I.

10 Claims, No Drawings

CROSS-LINKING OF MODIFIED ENGINEERING THERMOPLASTICS

The present invention pertains to a process for the cross-linking of modified engineering thermoplastics, in particular, of polymeric sulfinic acids or sulfinic acid salts.

Various ways for preparing cross-linked polymers and membranes are known in the prior art. Some of these may be mentioned here:

1) Preparation of cross-linked membranes by the copolymerization of mono- and bifunctional monomers (example: copolymerization of styrene and divinylbenzene in thin layers, followed by sulfonation of the cross-linked polymer membrane produced). This method has the disadvantage that the cross-linked ionomer membranes produced thereby have limited oxidation stabilities since both styrene and divinylbenzene contain tertiary C—H bonds which are sensitive to oxidation. (For a comparison of the oxidation sensitivities of styrene having a tertiary C—H bond and of α-methylstyrene without a tertiary C—H bond, see, for example: Assink, R. A.; Arnold C.; Hollandsworth, R. P., J. Memb. Sci. 56, 143–151 (1991).)

2) Functionalization of ion-exchanging groups of ionomers, followed by reaction with bi- or oligofunctional cross-linking agents to yield a cross-linked membrane (example: functionalization of sulfonic acid groups to yield the reactive acid chloride or imidazolide, followed by reaction with (aromatic) amines; Nolte, R.; Ledjeff, K.; Bauer, M.; Müllhaupt, R.; J. Memb. Sci. 83, 211 (1993)). In these cross-linking methods, cross-links (sulfonamide groups) are formed in the membrane which are not sufficiently stable to hydrolysis.

3) Chemical activation of ion-exchanging groups of ionomers, followed by reaction of the activated group with other groups of the polymer main chain to yield a cross-linked membrane (example: conversion of part of the sulfonic acid groups of sulfonated PEEK (polyetheretherketone) to sulfochloride groups, attack of the sulfochloride groups during membrane formation in the hydroquinone region of the PEEK repeating unit under Friedel-Crafts acylation and formation of hydrolysis-stable —SO$_2$— links (EP 0 574 791 A2). This method d has the disadvantage that it can be employed only with certain aryl polymers, such as PEEK.

From Kice, J. L.; Pawlowski, N. E.: J. Org. Chem. 28, 1162 (1963), it has been known that low-molecular sulfinic acids can disproportionate according to the following scheme of reactions:

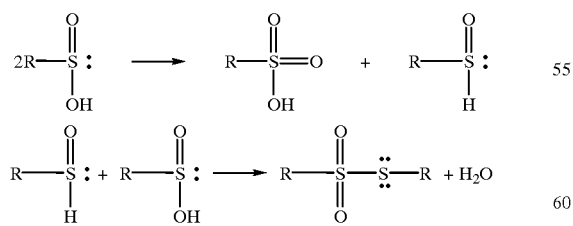

From Quaedvlieg, M., in: Houben-Weyl, Methoden der organischen Chemie, Vol. II, 606, Thieme Verlag, Stuttgart (1957), Ashworth, M. R. F., in: The Chemistry of Sulphinic Acids, Esters and their Derivatives (Ed.: S. Patai), chapter 4, 97–98, John Wiley Ltd., New York (1990); Allen, P.: J. Org. Chem. 7, 23 (1942), it has been known that sulfinate can readily be alkylated to the sulfone. The reaction was performed, inter alia, in alcohols having different chain lengths:

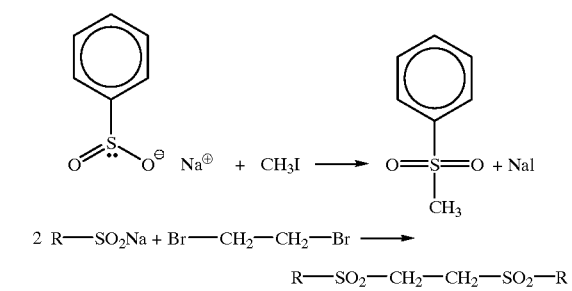

It has been the object of the present invention to provide novel processes for cross-linking modified engineering thermoplastics, in particular, of polymeric sulfinic acids or salts thereof.

The above object is achieved, in a first embodiment, by a process for the preparation of cross-linked polymers, characterized in that solutions of polymeric sulfinic acids or sulfinic acid salts (—SO$_2$Me), optionally in the presence of organic di- or oligohalogeno compounds [R(Hal)$_x$], are liberated from solvent and cross-linked to polymers, wherein Me stands for a monovalent or polyvalent metal cation;
R stands for an optionally substituted alkyl or aryl residue containing from 1 to 20 carbon atoms; and
Hal stands for F, Cl, Br or I.

It is particularly preferred that the sulfinic acids or salts thereof is derived from structures comprising aromatic nuclei having R$_1$ or R$_2$ structures of the following formulae as the repeating unit wherein

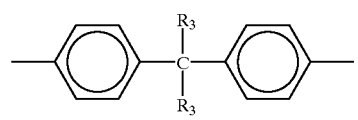

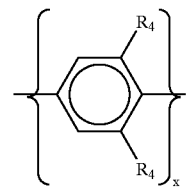

R$_3$ stands for hydrogen, trifluoromethyl or C$_n$H$_{2n+1}$, with n being from 1 to 10, in particular methyl;
R$_4$ stands for hydrogen, C$_n$H$_{2n+1}$, with n being from 1 to 10, in particular methyl or phenyl; and
x stands for 1, 2 and 3,
which are linked through bridging groups R$_5$ or R$_6$ wherein
R$_5$ stands for —O—, and
R$_6$ stands for —SO$_2$—.

It is particularly preferred according to the present invention that the solvent is selected from dipolar-aprotic solvents, such as NMP, DMAc, DMSO or DMF.

The polymer or one of the blend components is a polymer modified with sulfinic acid groups (—SO$_2$H) and/or sulfinic acid salt groups (—SO$_2$Me) (Me=Li, Na, K, Rb, Cs or other mono- or di-valent metal cations). The choice of basic materials (polymeric sulfinic acids/sulfinic acid salts) is not limited; all polymeric or oligomeric sulfinic acids can be employed as the basic materials. The advantage of the cross-linking method according to the invention over the prior art is characterized by the following items:

The processes can be universally employed: all polymeric sulfinates and sulfinic acids can be cross-linked according to this process.

A wide variety of polymers can be blended with the polymeric sulfinic acids/sulfinic acid salts. Cross-linked polymer blends are obtained having blend morphologies (microstructures) and cross-linking densities which can be adjusted within wide ranges. Such blends may be prepared by admixing monomers, oligomers, polymers, or mixtures thereof, with solutions of polymeric sulfinic acids/sulfinic acid salts.

The cross-linked polymers have improved thermal and chemical resistance as compared with the basic substances.

The hydrolytic stabilities of the cross-linked polymers and membranes are substantially improved over the hydrolytic stabilities of other cross-linkings, for example, the cross-linking of polymeric sulfonates through sulfonamide links.

It has now been surprisingly found that the per se known disproportionation reaction can be made use of for cross-linking polymers by preparing sulfinic acid containing polymers according to a known method (Kerres, J.; Cui, W.; Neubrand, W.; Springer, S.: Reichle, S.; Striege, B.; Eigenberger, G.; Schnurnberger, W.; Bevers, D.; Wagner, N.; Bolwin, K.: lecture (lector: J. Kerres), Euromembrane '95 Congress, Bath (UK), Sep. 18 to 20, 1995, Proceedings, pages 1–284 (1995)) or other methods and cross-linking the same via the above disproportionation reaction, wherein other polymers may be added to the solution of the polymeric sulfinic acid in an appropriate solvent (for example, DMSO, DMAc, DMF, NMP) which polymers are then integrated in the forming polymeric network.

The microstructure of the generated cross-linked polymer blend depends on the compatibility of the blend components. If all blend components are compatible with each other, an interpenetrating network will form in which the polymeric chains of the blend components are entangled to such an extent that the blend components can hardly be separated any more. If the blend components are immiscible with each other, a microphase structure will form in which some of the components are dispersed in a continuum of the: other components. The microphase structure is dependent on the kind of the blend components and the mixing ratio of the blend components. By appropriately selecting the blend components and their mixing ratio, cross-linked blend structures can be produced as desired.

The cross-linking process according to the invention can be employed, for example, for the preparation of cross-linked cation-exchange membranes. There are two ways of proceeding:

A polymeric sulfinic acid and a polymeric sulfonic acid are dissolved together in the same solvent (DMSO, DMAc, DMF, NMP) and then further processed.

A polymer the sulfinic acid groups of which have partially been oxidized to sulfonic acid groups (oxidation level 0 to 100%; the oxidation level can be adjusted through the quantity of oxidant added to the polymeric sulfonate) is dissolved in the solvent and then further processed.

This polymer solution is then cast on a substrate (glass plate, polished aluminum sheet, woven or non-woven fabric). Thereafter, the plate is placed in a drying oven and the solvent evaporated at elevated temperature, in particular above the boiling point of the solvent under the pressure conditions chosen. During the evaporation process, cross-linking of the polymeric sulfinic acid occurs. It has now been surprisingly found that the generated cross-linked cation-exchange membranes have a significantly increased thermal resistance as compared with the non-cross-linked polymeric sulfonic acid. Such cross-linked cation-exchange membranes can now be employed to advantage in electromembrane processes, for example, in electrodialysis or in membrane fuel cells. In particular, their use is of advantage in such cases where it is necessary to operate at elevated temperatures and under severe chemical conditions since the cation-exchange membranes cross-linked according to the process of the invention exhibit reduced swelling in addition to an increased thermal stability as compared with the swelling of non-cross-linked cation-exchange membranes having the same cation-exchange capacity.

It has been shown that the yield of sulfone formation increases when the chain length of the alcohol is increased from $CH_2$—$CH_2$ to $CH_2$—$CH_2$—$CH_2$—$CH_2$ [P. Allen, J. Org. Chem. 7, 23–30 (1942)]. It has now been surprisingly found in preliminary experiments that this reaction can be made use of for cross-linking polymers which contain sulfinate groups.

Surprisingly, this cross-linking process could be successfully used for cross-linking ion-exchange membranes as well. The basic conception had been as follows: The Li salt of the polymeric sulfinate, for example, polysulfone Udel® (PSU)-Li sulfinate which is obtained by the reaction of metallated PSU with $SO_2$, is mixed with the Li salt of polymeric sulfonates, for example, PSU-Li sulfonate which is obtained by the oxidation of PSU-Li sulfinate with oxidants, or with the Li salt of sulfonated PEEK, and the mixture is dissolved in dipolar-aprotic solvents, such as NMP, DMAc, DMSO or DMF. Then, an organic di- or oligohalogeno compound in which the halogen atoms can be substituted by nucleophilic substitution is added to the solution which is then stirred until complete mixing occurs. Thereafter, a thin film of the solution is prepared on a substrate, for example, on a glass plate, and the solvent is evaporated at elevated temperature under reduced pressure or by using a forced convection. During the evaporation of the solvent, the organic di- or oligohalogeno compound reacts with the sulfinate residues of the polymers under cross-linking to disulfone links and with formation of halogenide anions. The polymeric chains of the polymeric sulfonate are incorporated in the network of the polymeric sulfinate. The network prevents the sulfonate component of the polymer blend membrane from swelling too much and significantly increases the chemical stability of the cross-linked membrane. As in the other cross-linking process mentioned above, another possibility is to partially oxidize a polymeric sulfinate, for example, PSU(SO$_2$Li), to the polymeric sulfonate (every oxidation level between 0 and 100% being possible) and then to react the partially oxidized polymer with the dihalogeno compound. The advantage of this process is that the whole polymer is involved in the cross-linking reaction, in contrast to the cross-linking of polymer blends where only the polymeric sulfinate component is cross-linked.

EXAMPLES

1. Cross-linking of a polymeric sulfinic acid by a disproportionation reaction between sulfine groups with integration of polymeric sulfonic acid in the generated network 3 g of a polysulfone sulfinate (PSU Udel® (manufacturer: Amoco) with an average of one SO₂Li group per monomeric unit, 1.95 mmol of SO₂Li/g of polymer) was dissolved in 30 g of DMF. Then, 4 g of DOWEX® cation-exchange resin, H form, 2.5 mmol SO₃H/g of polymer, was added for converting the polymeric sulfinate to the polymeric sulfinic acid since only the sulfinic acid underwent the disproportionation reaction. The polymeric sulfinic acid was prepared in situ because sulfinic acids are very unstable chemically. The polymeric sulfinate was fairly stable and could be carefully dried without decomposing. After the polymeric sulfinic acid had been obtained in this way, 6 g of polysulfonesulfonic acid (PSU Udel® with an average of 0.9 SO₃H groups per monomeric unit, 1.7 mmol of SO₃H/g of polymer) was added to the solution. The polymeric sulfonic acid was dissolved with stirring. Then, the polymer solution was sheeted out on a glass plate or aluminum sheet to a thin film by means of a doctor blade. The plate with the film of polymer solution was placed in a drying oven, and the solvent was evaporated at temperatures between 80 and 120° C. under membrane pump vacuum. Thereafter, the plate with the membrane was immersed in deionized water. The membrane separated from the substrate.

Membrane data:

SO₃H content of the membrane: 1.33 mmol of SO₃H/g of polymer (theory: 1.35 mmol of SO₃H/g of polymer)

specific H⁺resistance of the membrane, measured in 0.5 N H₂SO₄ under a flow of direct current: 50 Ω·cm swelling of the membrane in deionized water at room temperature: 33%.

2. Cross-linking of a polymeric sulfinic acid salt by alkylation of sulfinic acid salts with integration of polymeric sulfonic acid in the generated network A solution was prepared of 1.8 g of a PSU Udel®-Li sulfinate having an average of one sulfinate group per monomeric unit,

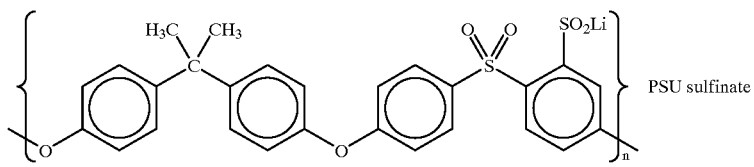

PSU sulfinate in 28 g of N-methylpyrrolidone (NMP). After dissolution of the sulfinate, 4.2 g of a PSU Udel®-Li sulfonate having an average of one Li sulfonate group per monomeric unit,

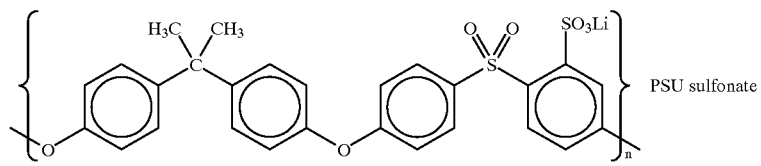

PSU sulfonate was added to the solution. After dissolution of the second component, 0.125 ml of 1,4-diiodobutane was added to the polymer solution. This was stirred for about ¼ hour. After this reaction time, the solution already began to grow more viscous. An about 0.5 mm thick film was sheeted out on a glass plate from the polymer solution. Then, the glass plate was placed in a drying oven, and the solvent was evaporated at temperatures of 90–120° C. for 16 h under a reduced pressure of 850 mbar at first and finally 50 mbar. During this time, the membrane was cross-linked. After evaporation of the solvent, the polymer film was separated from the glass plate and treated first in a 1 N HCl solution at 70° C. for 24 h and then in distilled water at 70° C. for 24 h, with extraction of LiI and solvent residues from the membrane.

Membrane properties:

thickness: 0.121 mm ion-exchange capacity: 1.35 meq of SO₃H/g of polymer swelling (Na form, hot water of 70° C., 24 h): 36% surface resistivity (Na form, 0.5 N Na₂SO₄): 3.11 Ω·cm² specific resistance (Na form, 0.5 N Na₂SO₄): 285 Ω·cm perm. selectivity (Na form, 0.5/0.1 N NaCl): 93.9k In one embodiment of this invention, a method for preparing cross-linked polymers is provided using solutions of polymeric sulfinic acids or polymeric sulfinic acid salts having mono or polyvalent metal cations and removing the solvent from the solutions to initiate cross-linking of the polymers. In an alternative embodiment, the solution of polymers includes aryl or alkyl, di- or oligo-, halogeno compounds having one to twenty carbons. The halogen can be flourine, chlorine, bromine or iodine.

In another embodiment of this invention, a method of preparing cross-linked polymers is provided using solutions of polymeric sulfinic acids or polymeric sulfinic acid salts having mono or polyvalent metal cations and cross-linking the polymers by a disproportionation reaction of the sulfinic acids.

In yet another embodiment of this invention, a method for preparing cross-linked polymers is provided using solutions of polymeric sulfinic acids or polymeric sulfinic acid salts having mono or polyvalent metal cations and using aryl or alkyl, di- or oligo-, halogeno compounds having one to twenty carbons and cross-linking the polymers by alkylating the sulfinic acid salts with the halogeno compounds. The halogen can be flourine, chlorine, bromine or iodine.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

What is claimed is:

1. A process for the preparation of cross-linked polymers, comprising the steps of:

providing a solution, in a dipolar, aprotic solvent, of polymeric sulfinic acids or polymeric sulfinic acid salts having a metal cation, wherein the metal cation is a monovalent or polyvalent cation;

admixing monomers, oligomers, polymers or mixtures thereof with said polymeric sulfinic acid solution; and removing solvent from said solution to initiate cross-linking of the polymers to form disulfone cross-links;

wherein said polymeric sulfinic acids comprise repeating units according to formula $R_1$ or formula $R_2$ wherein $R_1$ is

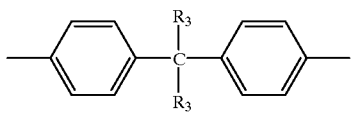

$R_2$ is

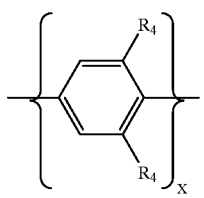

$R_3$ is hydrogen, trifluoromethyl, or $C_nH_{2n+1}$,
$R_4$ is hydrogen of $C_nH_{2n+1}$,
n is 1–10, and
x is 1–3,
further wherein $R_1$ or $R_2$ are linked through bridging groups $R_5$ or $R_6$, wherein $R_5$ is —O— and $R_6$ is —SO$_2$, and wherein said solution also contains organic compounds selected from the group consisting of C1–C20 substituted or unsubstituted alkyl dihalogeno compounds, C1–C20 substituted or unsubstituted aryl dihalogeno compounds, C1–C20 substituted or unsubstituted alkyl oligohalogeno compounds and C1–C20 substituted or unsubstituted aryl oligohalogeno compounds, wherein the halogen is fluorine, chlorine, bromine or iodine.

2. A process for the preparation of cross-linked polymers, comprising the steps of:

providing a solution, in a dipolar, aprotic solvent, of polymeric sulfinic acids or polymeric sulfinic acid salts having a metal cation, wherein the metal cation is a monovalent or polyvalent cation;

providing organic halogeno compounds selected from the group consisting of C1–C20 substituted or unsubstituted alkyl dihalogeno compounds, C1–C20 substituted or unsubstituted aryl dihalogeno compounds, C1–C20 substituted or unsubstituted alkyl oligohalogeno compounds and C1–C20 substituted or unsubstituted aryl oligohalogeno compounds, wherein the halogen is fluorine, chlorine, bromine or iodine; and cross-linking said polymers by alkylating said sulfinic salts with said halogeno compounds to form disulfone cross-links.

3. The process according to claim 1, wherein $R_3$ is methyl and $R_4$ is methyl.

4. The process according to claim 1, wherein $R_3$ is methyl and $R_4$ is phenyl.

5. The process according to claim 1 or 2, wherein the solvent is DMSO, DMAc, DMF, NMP, or mixtures thereof.

6. The process according to claim 1 or 2, wherein said polymeric sulfinic acids are partially oxidized to polymeric sulfonates.

7. The process according to claim 1, wherein said admixed polymer is an ion-exchange polymer.

8. The process according to claim 7, wherein said ion-exchange polymer has sulfonic acid groups, carboxy groups, phosphoric acid groups, quaternary ammonium groups, or mixtures thereof.

9. The process according to any of claims 1 or 2, wherein the product is an ion-exchange polymer or a cross-linked ion-exchange membrane.

10. The process according to claim 7 or 8 wherein the product is an ion-exchange polymer or cross-linked ion-exchange membrane.

* * * * *